United States Patent
Lee

(10) Patent No.: US 10,285,058 B2
(45) Date of Patent: May 7, 2019

(54) PROVIDING SECURE WI-FI IN AN OPEN WI-FI ENVIRONMENT

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/593,159

(22) Filed: Jan. 9, 2015

(65) Prior Publication Data

US 2016/0205553 A1 Jul. 14, 2016

(51) Int. Cl.
*H04L 29/06* (2006.01)
*H04W 12/08* (2009.01)
*H04W 12/06* (2009.01)
*H04W 84/12* (2009.01)

(52) U.S. Cl.
CPC ............ *H04W 12/08* (2013.01); *H04L 63/04* (2013.01); *H04W 84/12* (2013.01)

(58) Field of Classification Search
CPC ........ H04W 12/08; H04W 84/12; H04L 63/04
USPC .......................................................... 726/3
See application file for complete search history.

(56) References Cited

U.S. PATENT DOCUMENTS

| | | | | |
|---|---|---|---|---|
| 2010/0056104 A1* | 3/2010 | Butler | ................. | H04W 48/00 455/410 |
| 2010/0161490 A1* | 6/2010 | Alrabady | ............. | H04W 12/08 705/50 |
| 2012/0014271 A1* | 1/2012 | Damenti | ................. | H04L 12/14 370/252 |
| 2012/0036233 A1* | 2/2012 | Scahill | ............. | H04L 29/12066 709/220 |
| 2012/0134257 A1* | 5/2012 | Knox | .................... | H04W 28/08 370/218 |
| 2013/0039353 A1* | 2/2013 | Franco | .................. | H04W 40/36 370/338 |
| 2014/0051391 A1* | 2/2014 | Torres | ................... | H04W 12/06 455/411 |
| 2014/0092833 A1* | 4/2014 | Vannithamby | .... | H04W 52/0258 370/329 |
| 2014/0177589 A1* | 6/2014 | Sanderson | ............ | H04W 40/36 370/331 |
| 2014/0194153 A1* | 7/2014 | Salkintzis | ............... | H04W 4/12 455/466 |
| 2014/0310383 A1* | 10/2014 | Liu | ....................... | H04L 41/028 709/218 |
| 2014/0317676 A1* | 10/2014 | Nair | ..................... | H04L 63/104 726/1 |
| 2014/0334335 A1* | 11/2014 | Barathalwar | ......... | H04W 48/16 370/254 |

(Continued)

*Primary Examiner* — Haresh N Patel
(74) *Attorney, Agent, or Firm* — Ballard Spahr LLP

(57) ABSTRACT

Systems and methods for providing secure communications in an open network are provided. One method can comprise storing first information associated with a user device and a first network device. The first network device can be at a first location and can be configured to establish a secure connection between the user device and a first network. The user device can be detected via a second network device. A secure connection between the user device and a second network can be established via the second network device based upon at least a portion of the first information.

20 Claims, 11 Drawing Sheets

(56) References Cited

U.S. PATENT DOCUMENTS

| | | | |
|---|---|---|---|
| 2014/0335823 A1* | 11/2014 | Heredia | H04L 12/5895 455/411 |
| 2014/0365669 A1* | 12/2014 | Shamis | H04W 76/027 709/227 |
| 2015/0103804 A1* | 4/2015 | Gao | H04W 36/14 370/331 |
| 2015/0188940 A1* | 7/2015 | Lapidous | H04W 12/12 726/15 |
| 2016/0021578 A1* | 1/2016 | Bostick | H04W 48/17 370/332 |
| 2016/0173297 A1* | 6/2016 | Kanugovi | H04L 12/4633 370/328 |
| 2016/0254973 A1* | 9/2016 | Joanny | H04L 43/08 726/1 |

* cited by examiner

PROVIDING SECURE WI-FI IN AN OPEN WI-FI ENVIRONMENT

BACKGROUND

A network, such as a local area network, can comprise one or more network devices (e.g., access points (APs)) to provide a means for one or more user devices to communicate with and/or via the network. A network device can comprise a device that allows wired and/or wireless user devices to connect to a wired network using Wi-Fi, Bluetooth, or other standards. A network device can be configured to provide access to one or more services such as network-related services. As an example, a network device can be configured to provide one or more secure services exclusively to a first network such as a local area network (LAN) (e.g., secure network, private network, home network). As a further example, a network device can be configured to provide one or more open (e.g., public, unsecured) services to a second network such as a public Wi-Fi network. Services and security available over the first network may not be available on the second network. This disclosure identifies and address shortcomings in network arrangements.

SUMMARY

It is to be understood that both the following general description and the following detailed description are exemplary and explanatory only and are not restrictive. Some aspects relate to methods and systems for providing secure communications between a user device and a network. Some methods and systems described herein, in one aspect, can determine the security associated with a device and a first network, and can automatically provide that security to the device in a second network.

In an aspect, methods can comprise storing first information associated with a user device and a first network device. The first network device can be disposed at a first location. The first network device can be configured to establish a secure connection between the user device and a first network. The methods can also comprise detecting the user device via a second network device. A secure connection can be established between the user device and a second network via the second network device based upon at least a portion of the first information.

In another aspect, methods can comprise providing secure access to a first network via a first network device. An identifier can be received via the first network device. The identifier can be associated with a user device. The identifier can be mapped to stored network information. The identifier can be received, provided to or shared with a second network device. Secure access to a second network can be provided to the user device via a second network device using the identifier and the stored network information.

In a further aspect, methods can comprise providing a first identifier associated with a network and establishing open communication between a user device and the network based on the first identifier. A second identifier associated with the user device can be received. Security information associated with the user device can be determined based on the second identifier. A third identifier associated with the network can be provided. The third identifier can be associated with the security information. Secure communication between the user device and the network can be established based on the third identifier.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
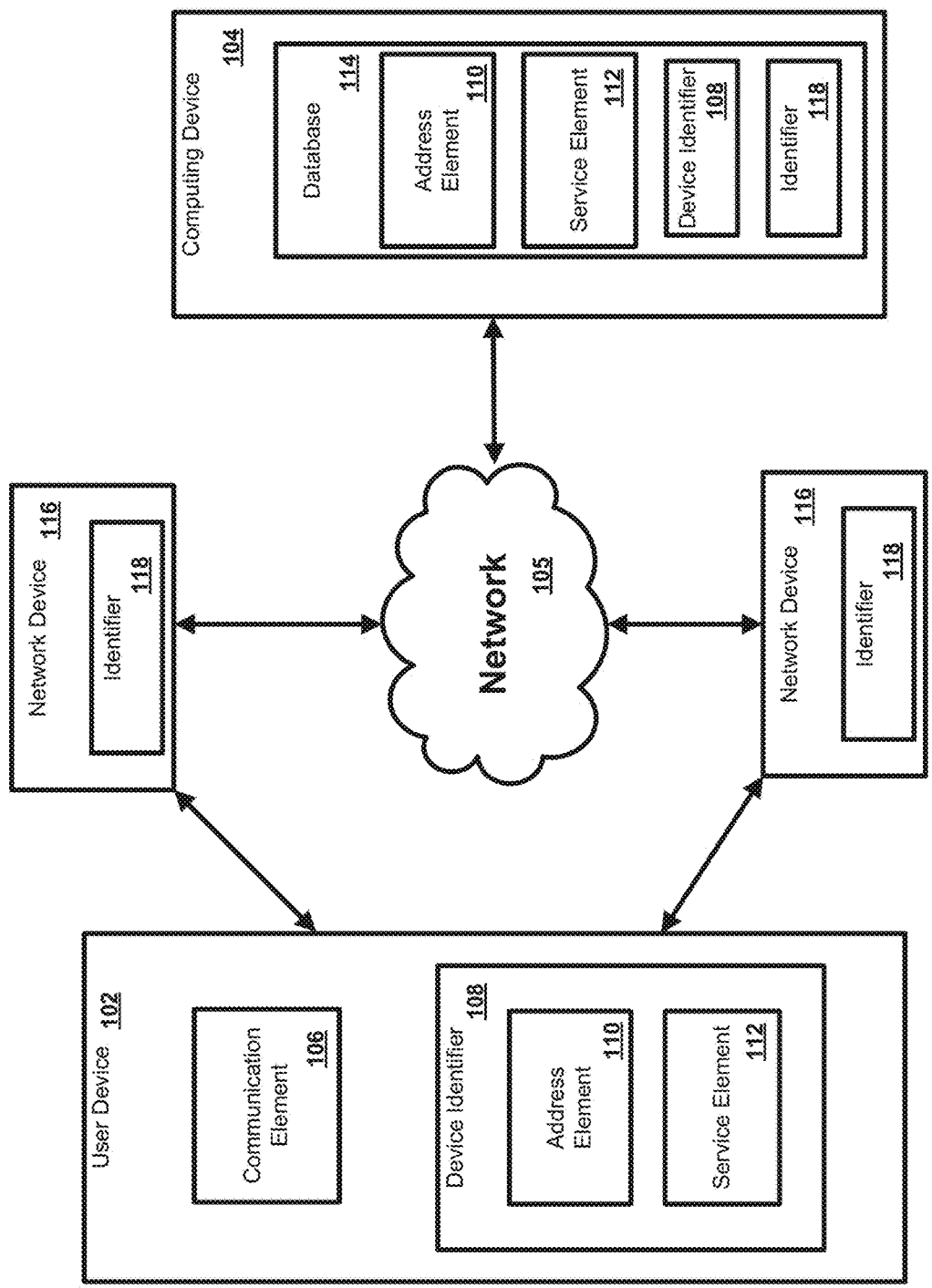
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in an aspect, can allow a user device to securely connect with a second network as it would with a first network, despite the second network not supporting secure connections. In an aspect, the first network can have an associated first plurality of security parameters. As an example, the security parameters can comprise one or more of, a password, WEP encryption, WPA encryption. WPA2 encryption, MAC address restriction, any other security parameters, or any combination of security parameters. In an aspect, the second network can have an associated second plurality of security parameters. In an aspect, the second plurality of security parameters can be less restrictive than the first plurality of security parameters. As an example, the first plurality of security parameters can include a password. In the example, the user device can connect with the second network using the first plurality of security parameters, including the password.

Open communication can comprise communication over an open network. An open network can comprise a network with no security parameters. Secure communication can comprise communication over a secure network. A secure network can comprise a network with one or more security parameters.

The methods and systems described herein, in one aspect, can allow a user device to securely connect with an open network as it would with a private or secure network such as a home network. Thus, the user device can enjoy the same security and level of services on the open network as on the secure network. The methods and systems described herein, in one aspect, can transmit a first identifier associated with an open network. In an aspect, the first identifier can be a first service set identifier (SSID). As an example, a user device can connect to the open network, a computing device (e.g., gateway device, computing device, server, router, etc.) can recognize the user device and the computing device can retrieve a second identifier associated with a secure network and the user device. In an aspect, the second identifier can be a second SSID. The computing device can transmit the second identifier associated with the secure network to the user device. The user device can connect to the open network using second identifier and one or more security parameters associated with the secure network, if any. As an example, the security parameters can comprise one or more of, a password, WEP encryption, WPA encryption, WPA2 encryption, MAC address restriction, any other security parameters, or any combination of security parameters.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback such as an application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., mapped identifiers, relational tables, user device identifiers (e.g., identifier 108) or records, network device identifiers (e.g., identifier 118), or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network such as network 105. As an example, one or more of the network devices 116 can facilitate the connection of a device, such as user device 102, to the network 105. As a further example, one or more of the network devices 116 can be configured as a network gateway. In an aspect, one or more network devices 116 can be configured to allow one or more wireless devices to connect to a wired and/or wireless network using Wi-Fi, Bluetooth or similar standard.

In an aspect, the network devices 116 can be configured as a mesh network. As an example, one or more network devices 116 can comprise a dual band wireless network device. In an aspect, the network devices 116 can be configured to transmit a first signal associated with a first network. As an example, the network devices 116 can be configured with a beacon first service set identifier (SSID) to function as a beacon associated with a local network for a particular user or users. In an aspect, the network devices can be configured to transmit a second signal associated with a second network. As an example, the network devices 116 can be configured with a second service set identifier (SSID) to function as a secondary beacon to allow secure connection to an open network such as a public network.

In an aspect, one or more network devices 116 can comprise an identifier 118. As an example, one or more identifiers can be a media access control address (MAC address). In an aspect, each of the network devices 116 can comprise a distinct identifier 118. As an example, the identifiers 118 can be associated with a physical and/or logical location of the network devices 116.

In an aspect, the user device 102 can provide information such as identification information (e.g., device identifier 108, credentials, etc.) to one or more network devices 116. As an example, the user device 102 can request service such connectivity to a network by providing information to the network device 116. In another aspect, the network device 116 can transmit the information received from the user device 102 to the computing device. As an example, the network device 116 can invoke a lookup algorithm to locate a record associated with the information provided by the user device 102. As a further example, the record can be located in service provider database (e.g., database 114). In a further aspect, the information provided by the user device 102 may be associated with an identifier of the network device 116. As an example, a database record can comprise a mapping of a device identifier (e.g., device identifier 108) and an identifier (e.g., identifier 118) associated with the network device 116.

In an aspect, when a user device 102 can connect with a first network such as a LAN associated with a first SSID via a first network device (e.g., network device 116, gateway device, computing device 104, server, router, etc.). In an example, when the user device 102 connects with the LAN, the first network device can generate or receive an address mapping object (e.g., mapping pair, <mac-address, IP address>) associated with the user device 102. As an example, a MAC address associated with the user device 102 can be mapped to an IP address that is associated with the LAN (e.g., home network) to which the user device 102 is connected. When the user device 102 connects to the first network via the first network device, the connection can be protected by a first set of security parameters, or not protected at all. Security parameters can comprise one or more of, a password, WEP encryption, WPA encryption, WPA2 encryption, MAC address restriction, any other security parameters, or any combination of security parameters. In the example, the user device 102 can disconnect with the first network. Subsequently, when the user device 102 associates (e.g., connects) with a second network, the second network device can check a device identifier (e.g., MAC address) associated with the user device 102 against one or more mapping objects (e.g., stored at database 114). In an aspect, the second network can be an open network with no security parameters. In an aspect, the second network can be a protected network with a second set of security parameters. In an aspect, if the device identifier is located in the one or more mapping objects, the first SSID can be broadcast to the user device 102 even though the user device 102 may be located out of the range of the first network. In a further aspect, if the device identifier is located in the one or more mapping objects, and the user device 102 provides one or more of the first set of security parameters, the first SSID can be broadcast to the user device 102 even though the user device 102 may be located out of the range of the first network. The user device 102 can receive the first SSID via the second network and can connect to the second using the first SSID. When the user device 102 connects to the second network, communications therebetween can be protected by the first set of security parameters. Accordingly, the user device 102 can utilize the same level of protection when connected with the second network that the user device 102 utilizes when connected with the first network.

Figure 2:
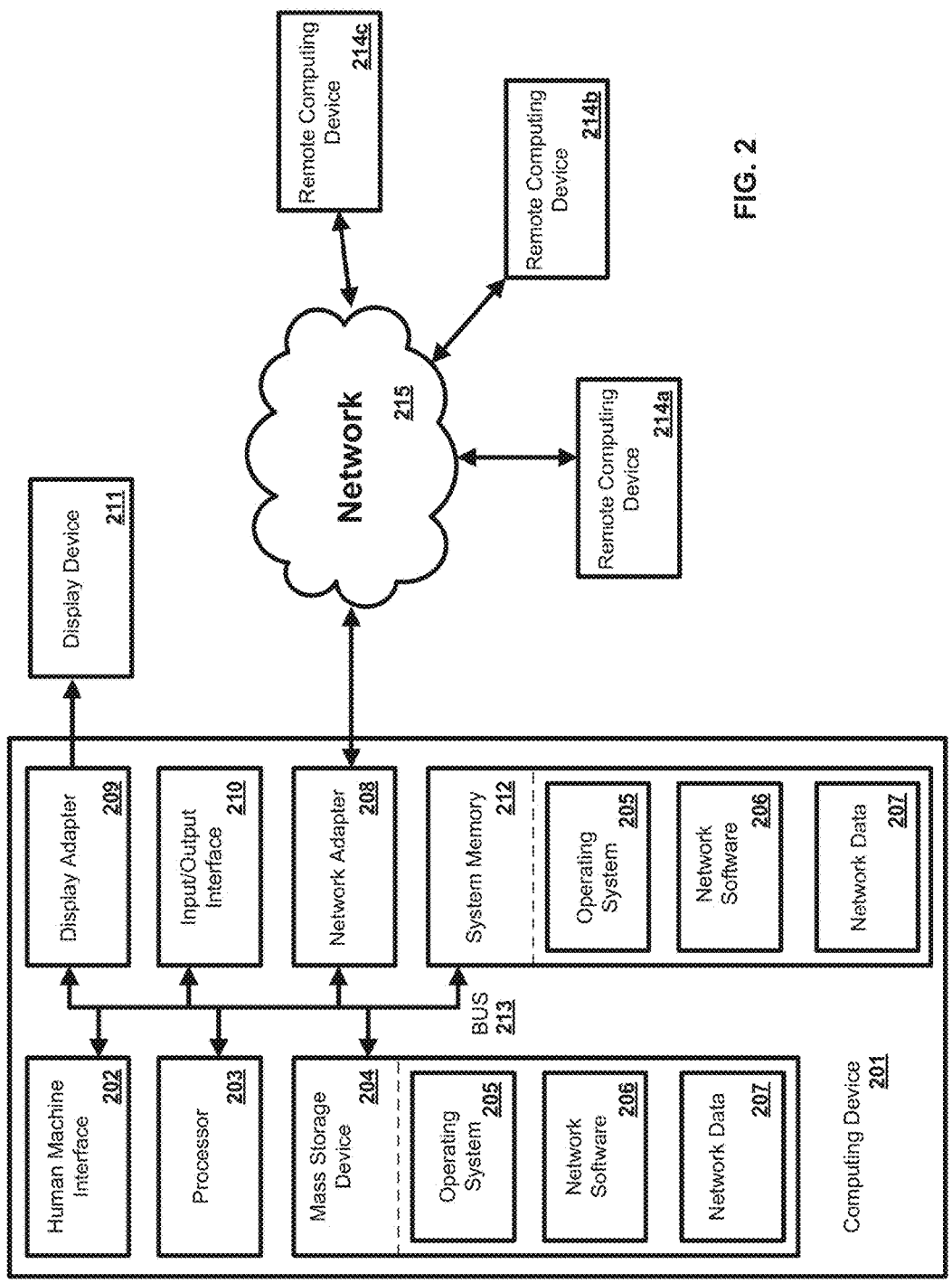
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise smartphones, tablets, set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processors 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processor 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, a touchscreen, tactile input devices such as gloves and other body coverings, and the like. These and other input devices can be connected to the processor 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), a touchscreen, or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, a portable computer, a smartphone, a tablet, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
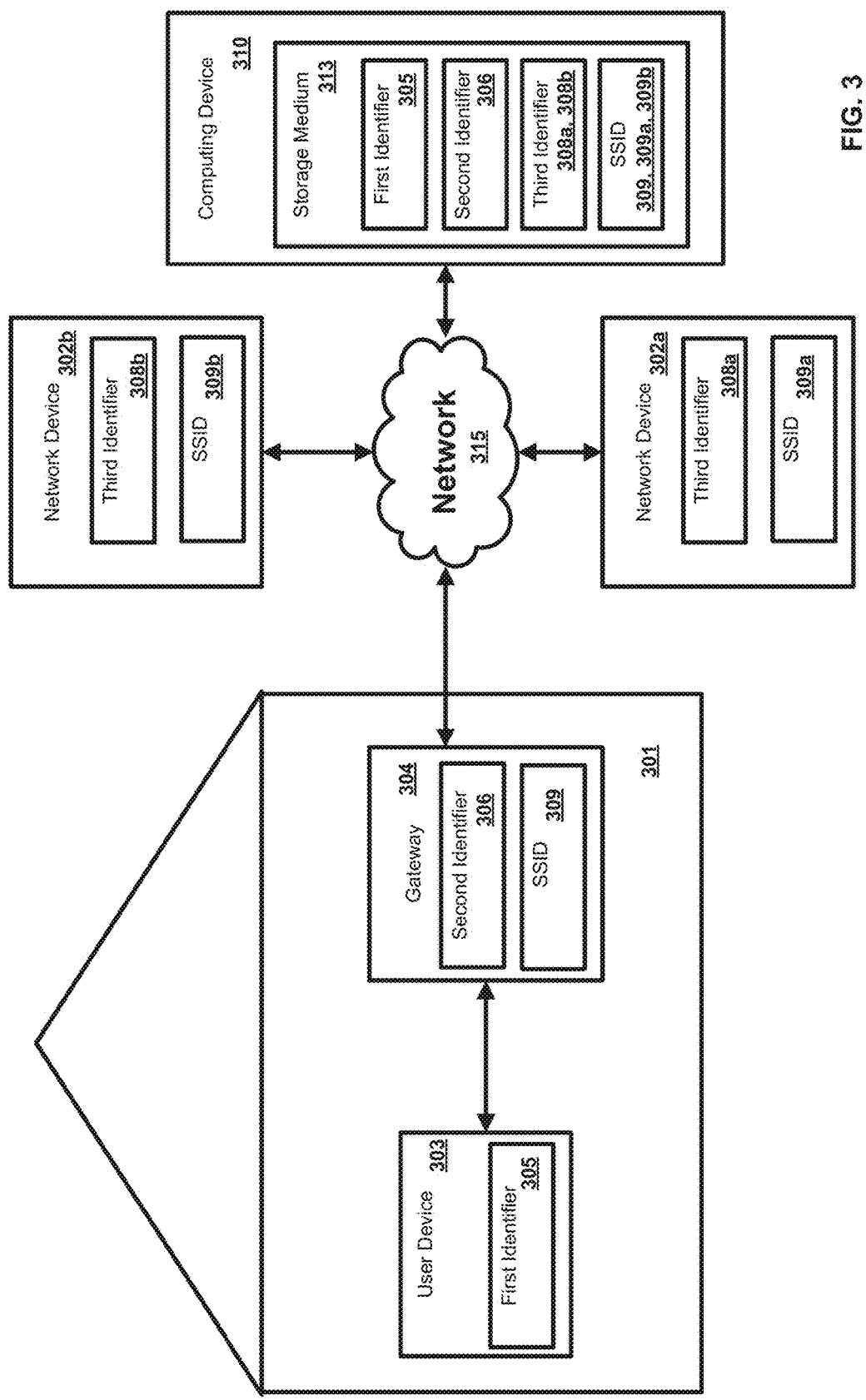
FIG. 3 is a diagram of an exemplary system and network.

FIG. 3 illustrates an exemplary system and network 315. In an aspect, a user device 303 can be in communication with a network 315, via a gateway 304. As an example, the gateway 304 can be a network device, router, switch, communication device, or any other known device for entry onto a network 315. As another example, a network 315 can be private or public. As another example, one or more user devices 303 can be an electronic device such as a computer, a smartphone, a laptop, a tablet, a set top box, a display device, or other device capable of communicating via the network 315.

In an aspect, the user device 303 can be associated with a first identifier 305 such as a user identifier and/or device identifier. As an example, the first identifier 305 can be any identifier, token, character, string, or the like, for differentiating one user or user device (e.g., user device 303) from another user or user device. In a further aspect, the first identifier 305 can identify a user or user device as belonging to a particular class of users or user devices. As a further example, the first identifier 305 can comprise information relating to the user device such as a manufacturer, a model or type of device, a service provider associated with the user device 303, a state of the user device 303, a locator, and/or a label or classifier. Other information can be represented by the first identifier 305. In an aspect, the first identifier 305 can be an internet protocol address, a MAC address, a network address, an Internet address, or the like. As an example, the first identifier 305 can be relied upon to establish a communication session between the user device 303 and the computing device 310 or other devices (not shown) connected to network devices 302a, 302b and/or networks 315. A device connected to the network devices 302a, 302b ("node devices") can be a computer, a smartphone, a laptop, a tablet, a set top box, a display device, or other device capable of communicating via the network 315. As a further example, the first identifier 305 can be used as an identifier or locator of the user device 303. In an aspect, the first identifier 305 can be persistent for a particular network 315 and/or location. A persistent identifier on a particular network 315 and/or location can be a static and globally unique identifier.

In an aspect, one or more of the node devices can be configured to communicate with another of the node devices and/or the gateway 304 via one or more communication paths. In an aspect, the one or more communication paths can comprise one or more uninterrupted communication links, sequential links, pre-defined paths or links, and/or intervening nodes. Links can comprise a single point-to-point connection between two devices or network devices. Paths can comprise one or more links. As an example, one or more of the communication paths can comprise one or more of the node devices. As a further example, one or more of the node devices can be configured as a mesh network. In an aspect, one or more of the communication paths can be configured to transmit one or more services.

Figure 4:
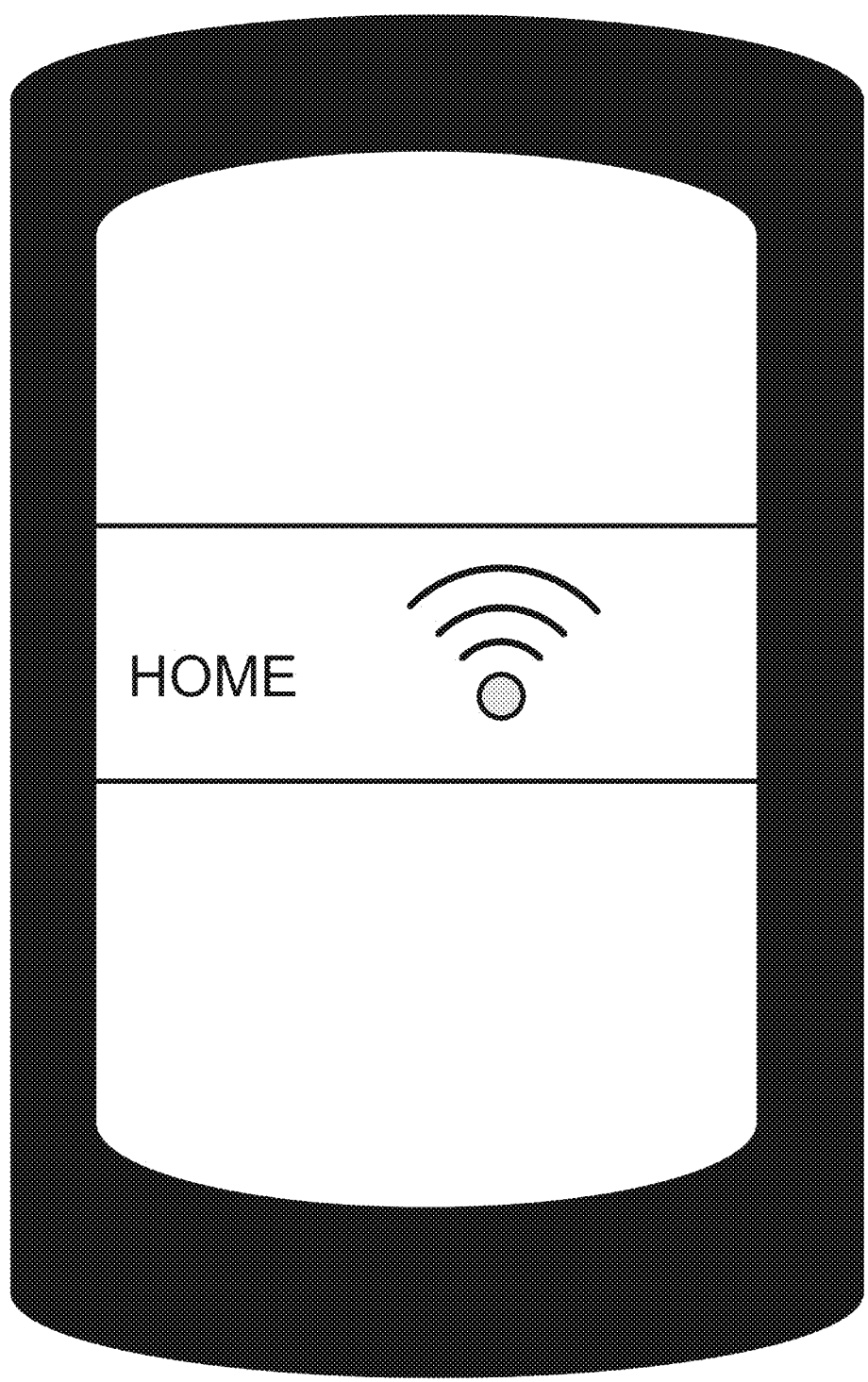
FIG. 4 is a user interface used with an exemplary method.

In an aspect, the gateway 304 can be configured to transmit a signal associated with a first network. As an example, the gateway 304 can be configured to broadcast a service set identifier (SSID) 309 (e.g., associated with a user network or private network) and to function as an access point for a local network for a particular user or users. As a further example, the particular user or users can be users within and/or near a certain premises 301, such as a residence or office. As an example, FIG. 4 illustrates an exemplary user interface that can be displayed on a user device 303 when a user is within the structure 301 and can connect to a network through the gateway 304.

Returning to FIG. 3, in an aspect, one or more node devices can be in communication with the gateway 304. As an example, one or more node devices and/or the gateway 304 can be configured to allow one or more wireless devices to connect to a wired and/or wireless network using Wi-Fi. Bluetooth or other standard. The gateway 304 can comprise an identifier such as a second identifier 306. In an aspect, the second identifier 306 can be any identifier, token, character, string, or the like, for differentiating one network device (e.g., gateway 304, network device 302a, 302b) from another network device. In a further aspect, the second identifier 306 can identify a device as belonging to a particular class of service or device. As a further example, the second identifier 306 can comprise information relating to the user device such as a manufacturer, a model or type of device, a service provider associated with the network device, a state of the network device, a locator, and/or a label or classifier. Other information can be represented by the second identifier 306. In an aspect, the second identifier 306 can be an internet protocol address, a MAC address, a network address, an Internet address, or the like. As an example, the second identifier 306 can be relied upon to establish a communication session between the user device 303 and the gateway 304 or other node devices and/or networks. As a further example, the second identifier 306 can be used as an identifier or locator of the user device 303 and/or a network device. In an aspect, the second identifier 306 can be persistent for a particular network and/or location. In another aspect, the first identifier 305 can be the same or different from the second identifier 306. As an example, the first identifier 305 can be a physical identifier (e.g., MAC address), while the second identifier 306 can be a network identifier (e.g., TP address). A physical identifier can be a unique identifier for facilitating communications on the physical network segment. A network identifier can be a numerical label assigned to a device attached to a network for facilitating communications over the network. As a further example, the first identifier 305 can be a user identifier stored in the device or a device identifier such as international mobile station equipment identity (IMEI), while the second identifier 306 can be a serial number associated with the device. However, other identifiers can be used.

In an aspect, one or more network devices 302a, 302b can be in communication with the gateway 304. As an example, one or more network devices 302a, 302b and/or the gateway 304 can be configured to allow one or more wireless devices to connect to a wired and/or wireless network using Wi-Fi. Bluetooth or similar standard. In an aspect, one or more third identifiers 308a. 308b can be associated with a respective one or more network device 302a, 302b. In an aspect, the third identifiers 308a, 308b can be any identifier, token, character, string, or the like, for differentiating one network device (e.g., gateway 304, network device 302a, 302b) from another network device. In a further aspect, the third identifiers 308a, 308b can identify one or more network device 302a, 302b as belonging to a particular class of service or device. As a further example, the third identifiers 308a, 308b can comprise information relating to the user device such as a manufacturer, a model or type of device, a service provider associated with the network device, a state of the network device, a locator, and/or a label or classifier. Other information can be represented by the third identifiers 308a, 308b. In an aspect, the third identifiers 308a, 308b can be an internet protocol address, a MAC address, a network address, an Internet address, or the like. As an example, the third identifiers 308a, 308b can be relied upon to establish a communication session between the user device 303 and the network device 302a, 302b or other node devices and/or networks. As a further example, the third identifiers 308a, 308b can be used as an identifier or locator of the user device 303 and/or a network device. In an aspect, the third identifiers 308a, 308b can be persistent for a particular network and/or location. In another aspect, the first identifier 305 can be the same or different from the third identifiers 308a, 308b. As an example, the first identifier 305 can be a physical identifier (e.g., MAC address), while the third identifiers 308a, 308b can be a network identifier (e.g., IP address). As a further example, the first identifier 305 can be a user identifier stored in the device or a device identifier such as international mobile station equipment identity (IMEI), while the third identifiers 308a, 308b can be a serial number associated with the device. However, other identifiers can be used.

In an aspect, a computing device 310 can be in communication with a network device such as gateway 304. As an example, the computing device 310 can be or comprise an application server, management device, auto-configuration server (ACS), authentication, authorization, and accounting (AAA) server, etc. In another aspect, the computing device 310 can be located within a network such as a wide area network (WAN).

In an aspect, the computing device 310 can manage information related to users or subscribers. For example, the computing device 304 can contain a subscriber database in storage medium 313. The subscriber database can associate various parameters, such as, for example, an account name, device identifier, e-mail address, e-mail password, identifiers (305, 306), passwords for identifiers (305, 306), and SSIDs 309 with a particular subscriber. In an aspect, computing device 310 can associate a subscriber with various parameters user device 303, such as, for example, first identifier 305, and various parameters of gateway 304, such as, for example, second identifier 306 and SSID 309 when user device 303 establishes a communication with network 315 through gateway 304. In an aspect, any information stored in a subscriber database associated with a subscriber can be used as a security parameter. In an aspect, any information stored in a subscriber database associated with a subscriber can be used to identify the subscriber and one or more appropriate security parameters associated with the subscriber.

In an aspect, the computing device 310 can manage the communication between the gateway 304 and a storage medium 313 for sending and receiving data therebetween. In an aspect, the computing device 310 can be in communication with one or more network devices (e.g., gateway 304, network devices 302a, 302b, and/or the node devices) for mapping first identifiers 305 with corresponding second identifiers 306 in storage medium 313. As a further example, the transmitted information can comprise an identifier associated with a device seeking communication with one or more networks. In an aspect, the transmitted information can comprise one or more of a MAC Address, a serviceable Address, connectivity, IP Address, Geo-Location, Local DNS Resolver, and the like. In another aspect, the information can be transmitted via a dynamic host configuration protocol (DHCP) request or via remote authentication dial-in user service (RADIUS), for example.

In another aspect, the storage medium 313 can store a plurality of data sets such as mapping objects, first identifiers 305, second identifiers 306, third identifiers 308a, 308b, and/or SSIDs 309 or other information. As a further example, the gateway 304 can request and/or retrieve a file from the storage medium 313. In an aspect, the storage medium 313 can store information relating to the user device 303, the gateway 304, and/or a relationship between the user device 303 and the gateway 304. As an example, the computing device 310 can obtain the first identifier 305 from the gateway 304 and retrieve information from the storage medium 313 such as a mapping of the first identifier 305 to the SSID 309 and/or the second identifier 306. The storage medium 313 can be disposed remotely from the computing device 310 and accessed via direct or indirect connection. The storage medium 313 can be integrated with the computing device 310 or some other device or system.

Figure 5:
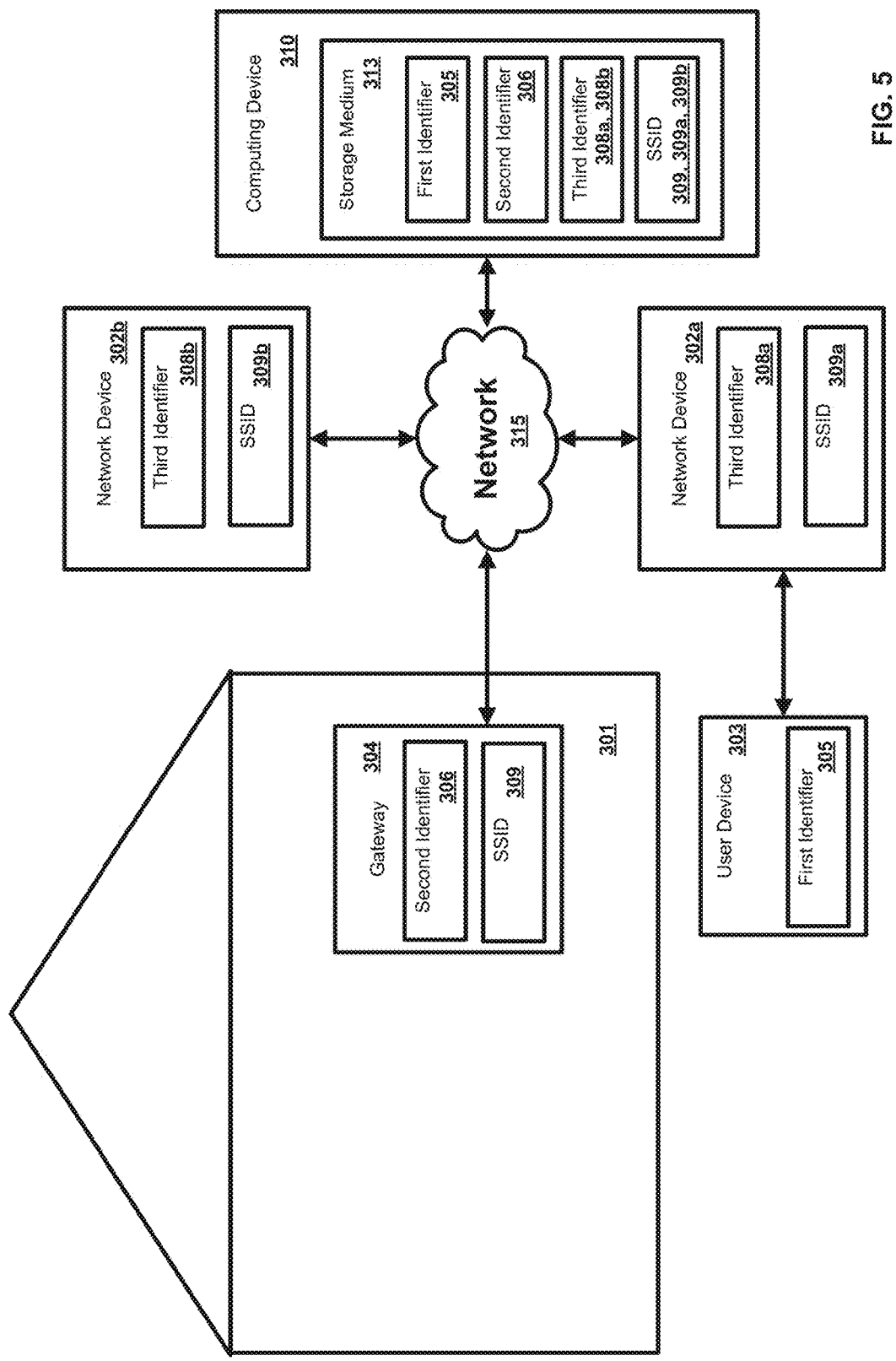
FIG. 5 is a diagram of an exemplary system and network.

As shown in FIG. 5, a user device 303 can communicate through a network 315 by connecting to one or more of the network devices 302a, 302b. As an example, the network devices 302a, 302b can comprise a device that allows wired and/or wireless user devices to connect to a wired network 315 using Wi-Fi, Bluetooth, or related standards. As a further example, the network devices 302a, 302b can be a Wi-Fi "hotspot."

Figure 6:
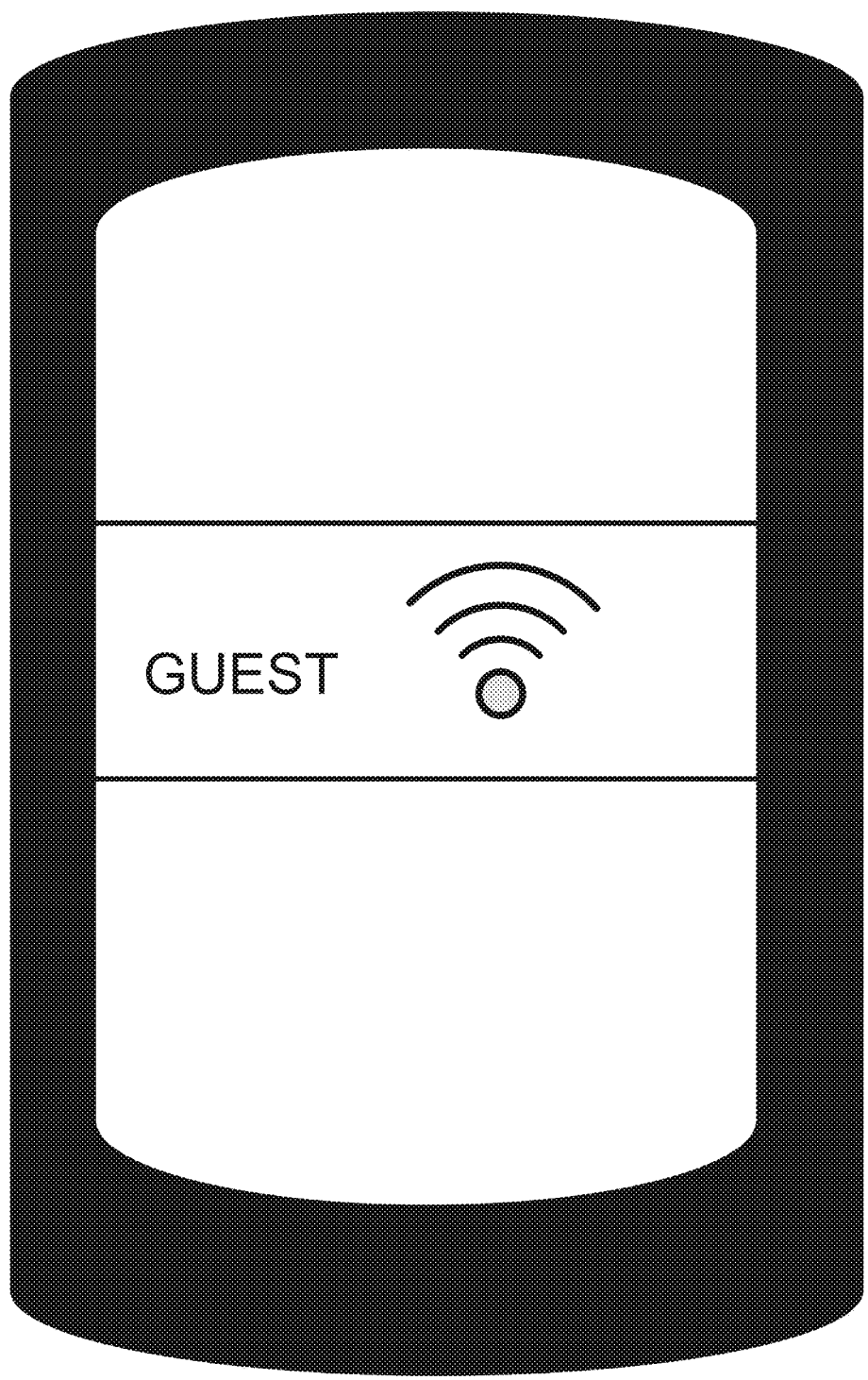
FIG. 6 is a user interface used with an exemplary method.

In an aspect, user device 303 can establish a connection with network 315 through network device 302a, in response to network device 302a broadcasting SSID 309a. SSID 309a can be a public SSID that does not require a security parameter to establish a connection to network device 302a, or can have shared security parameters to enable groups of users to connect. As an example, FIG. 6 illustrates an exemplary user interface that can be displayed on a user device 303 when a user can connect to a network 315 through a network device 302a, 302b. Turning back to FIG. 5, computing device 310 can receive various parameters associated with user device 303. In an aspect, computing device 310 can receive first identifier 305 associated with user device 303. Computing device 310 can retrieve the user or subscriber information associated with first identifier 305, including SSID 309. Computing device 310 can provide network device 302a with SSID 309, so that network device 302a can create-broadcast SSID 309 to user device 303 and require the same security parameters that are used to connect to gateway 306 (e.g., password, etc. . . . ). User device 303 can establish a connection with network device 302a using the SSID 309 utilizing the security parameters otherwise associated with connecting to gateway 304 using SSID 309.

Figure 7:
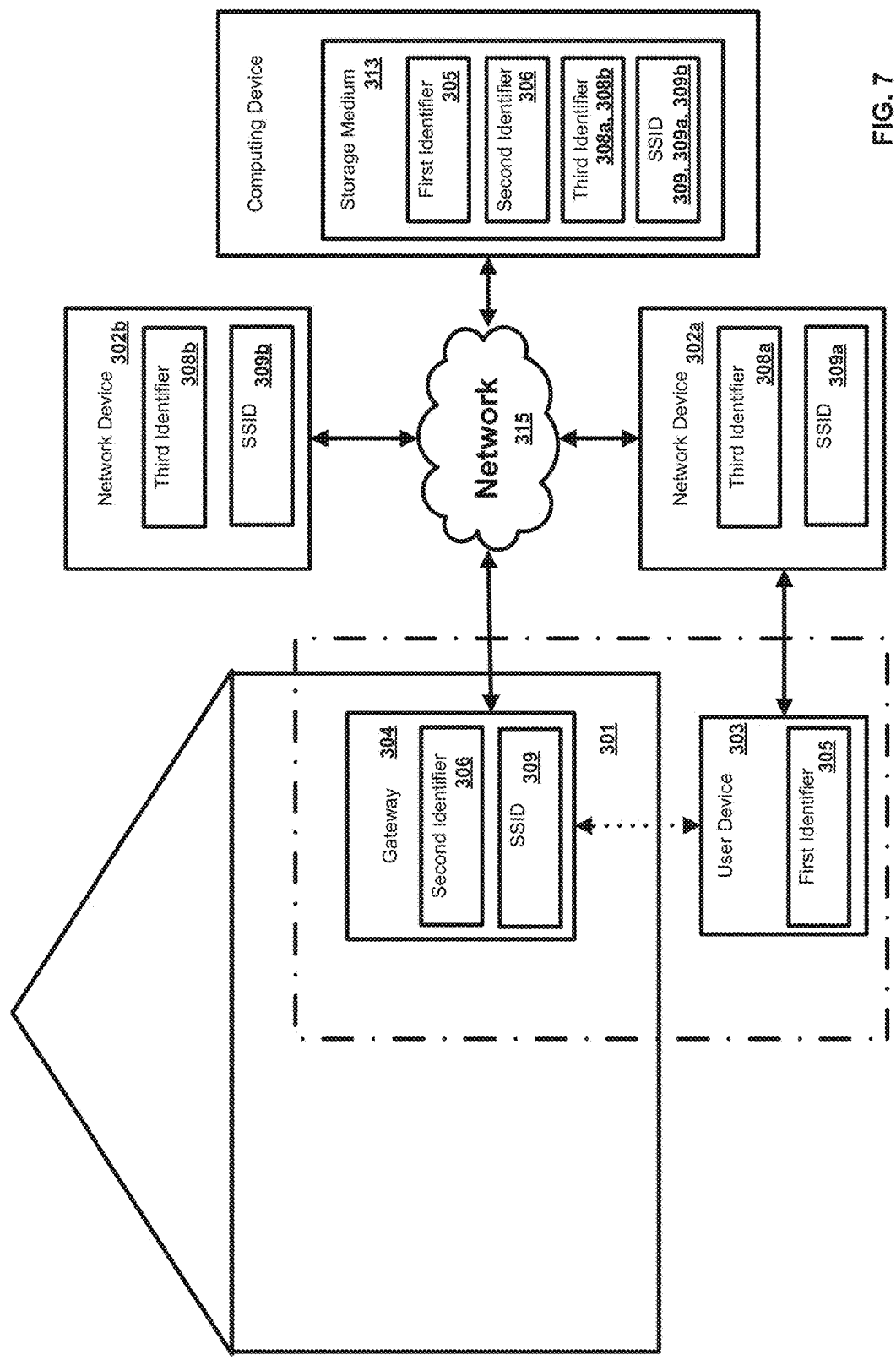
FIG. 7 is a diagram of an exemplary system and network.
Figure 8:
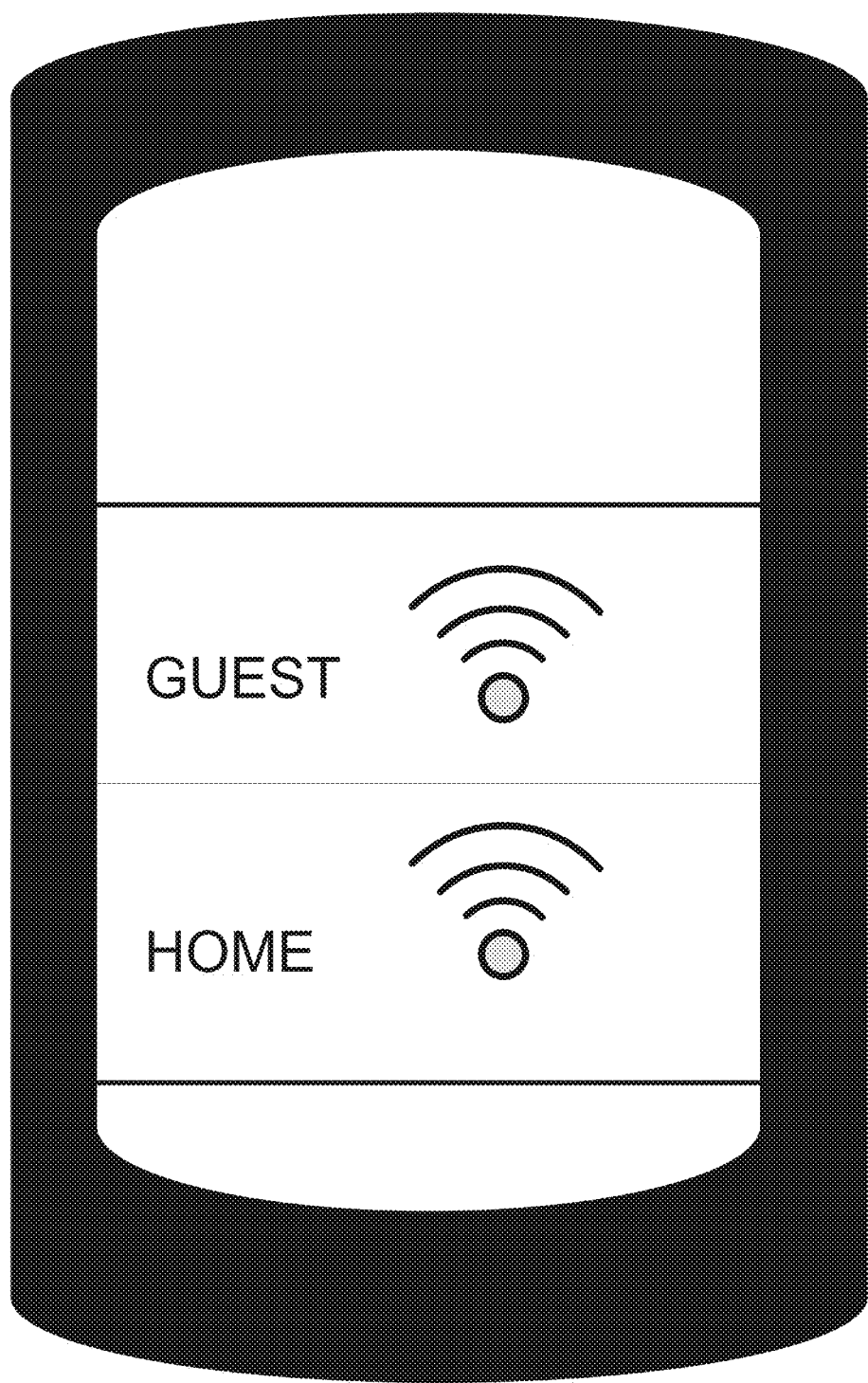
FIG. 8 is a user interface used with an exemplary method.

As shown in FIG. 7, the network device 302a, can create and broadcast an SSID to the user device 303 that will appear to the user device 303 as SSID 309. As the dotted line indicates, from the perspective of the user device 303, the connection of the user device 303 to network 315 through network device 302a is effectively the same as when the user device 303 connects through the gateway 304. As an example, FIG. 8 illustrates an exemplary user interface that can be displayed on the user device 303 when the user device 303 receives an SSID from network device 302a that appears to the user device 303 as the SSID 309 from gateway 304. If the user device 303 is directed to connect to network 315 using the SSID that appears as SSID 309 to the user device 303, then network device 302a can retrieve security parameters associated with a subscriber account associated with first identifier 305. Security parameters can include a password, WEP encryption, WPA encryption, WPA2 encryption, MAC address restriction, any other known security parameters, or any combination of security parameters. The user device 303 can be required to provide security parameters before the user device 303 is allowed to connect to the network 315 through network device 302a in response to a direction to connect to network 315 using the SSID that appears to the user device 303 as SSID 309. Once user device 303 provides the requested security parameters, the user device 303 can connect to the network 315 through the network devices 302a, and communications through the network 315 can enjoy the same security parameters as if the user device 303 is connecting directly to the gateway 304 on location 301.

Turning back to FIG. 3, in an aspect, the communication path made from the user device 303 to one or more node devices through the gateway 304 can be a first network. Turning back to FIG. 5, the communication path made from the user device 303 to one or more node devices through the network device 302a can be a second network. As an example, the first network can be a home network and can be associated with a private SSID (SSID 309), while the second network can be an open, public network associated with a public SSID (SSID 309a). Additionally, the second network can be a private network, with a private SSID 309a that is different from SSID 309.

Turning back to FIG. 7, in an aspect, a device such as the user device 303 can request service connectivity to a network by providing information (e.g., credentials, identifiers, etc.) to an access point such as network device 302a. In another aspect, the network device 302a can transmit the information received from the user device 303 to the computing device 310. As an example, the network device 302a and/or the computing device 310 can invoke a lookup algorithm to locate a record (e.g., mapping object) associated with the information provided by the user device 303. As a further example, the record can be located in a network database (e.g., storage medium 313). In a further aspect, the information provided by the user device 303 may be associated with an identifier of the user device 303, one or more node devices, one or more network devices 302a, 302b and/or one or more gateways 304. As an example, a database record can comprise a mapping of a device identifier (e.g., first identifier 305) and another identifier (e.g., second identifier 306). As an example, a MAC address associated with the user device 303 can be mapped to an IP address that is associated with the first network (e.g., home network) to which the user device 303 previously connected (FIG. 3). As such, multiple networks associated with different SSID's can interact with the user device 303 as if the user device 303 was connected to the first network (e.g., home network). Security parameters that are normally exclusively available at the first network can then be accessed outside the first network.

Figure 9:
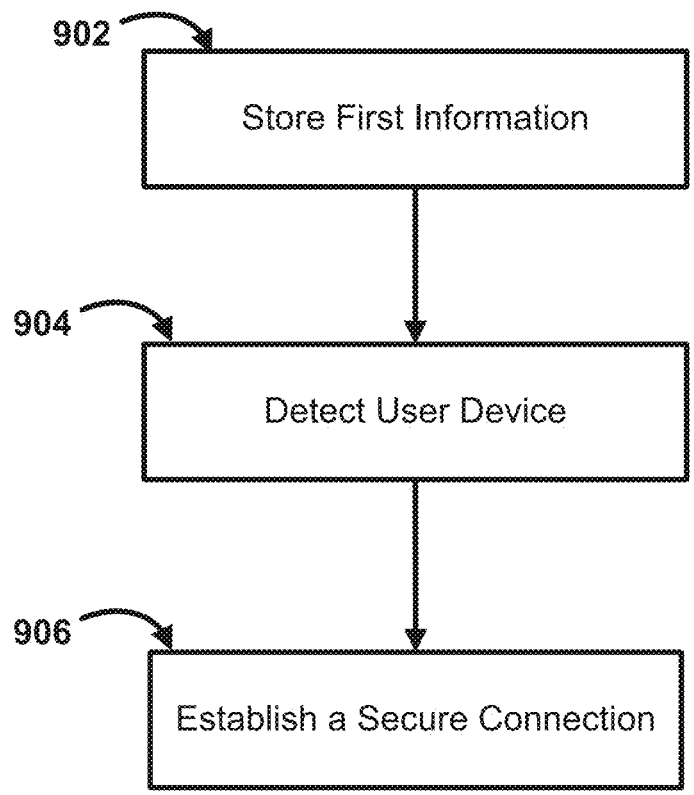
FIG. 9 is a flow chart of an exemplary method.

In an aspect, provided are methods for providing secure communications in an open network. An exemplary method is shown in FIG. 9. In step 902, first information can be stored. In an aspect, the first information can comprise a first identifier. In an aspect, the first information can comprise an identifier associated with a user device. In an aspect, the first information can be or comprise a MAC address, an IP address, a service set identifier, security parameters, or a combination thereof. In another aspect, the first information can be associated with one or more of a user device and a first network device. As an example, the first network device can be at a first location and can be configured to establish a secure connection between a user device and a first network such as a private network or public network. In a further aspect, the first information can be stored as a data set with an association to other information such as a second identifier. For example, the first information can be stored as a mapped object with a second identifier (e.g., first information mapped to the second identifier, MAC address mapped to IP address, etc.). In another example, the first information can be stored as a first identifier associated with a user device mapped to stored security parameters. In an aspect, the first network device can comprise a gateway, for example at a user's home. The first network device can provide the first information to a computing device for access by a second network device upon detection of the user device by the second network device.

In step 904, the user device can be detected by the second network device. In an aspect, the second network device can be configured to establish an open connection between the user device and the second network. The second network device can receive the first information from the user device, for example, an identifier of the user device through the open connection. The second network device can transmit the first information to a computing device and request an SSID associated with the first network device, and any associated security parameters. The computing device can determine the SSID associated with the first network device and the security parameters associated with the first network device. The computing device can transmit the determined SSID and/or security parameters to the second network device.

In a further aspect, the second network device can be at a second location different from the first location, for example, the second network device can be a public WiFi hotspot. As an example, the first network device can be part of a first network and the second network device can be part of a second network. As another example, one or more of the first network and the second network can be a private network or public network. As a further example, the first network can be a private network and the second network can be a public network. Other network configurations can be implemented. In an aspect, the second network device can comprise a gateway.

In step 906, the user device and a second network can establish a secure connection via the second network device. The second network device can configure and broadcast the received SSID according to the received security parameters. The security parameters used for the secure connection between the user device and the first network device can then be used in the secure connection between the user device and the second network device. Security parameters can comprise one or more of, a password, WEP encryption, WPA encryption, WPA2 encryption, MAC address restriction, any other security parameters, or any combination of security parameters. Thus, the user device can establish a secure connection with the second network device using the SSID and security parameters associated with the first network device.

Figure 10:
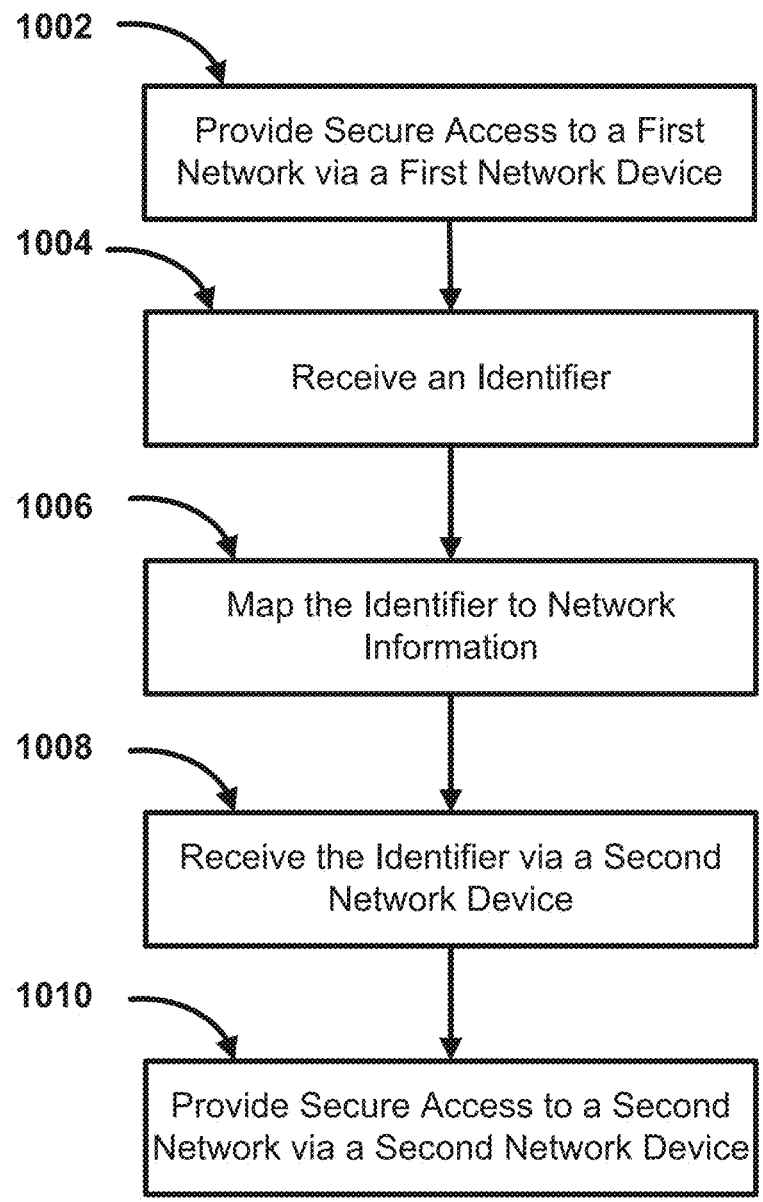
FIG. 10 is a flow chart of an exemplary method.

Another exemplary method is shown in FIG. 10. In step 1002, secure access to a first network (e.g., LAN) can be provided via a first network device to a user device. In an aspect, providing access to the first network can comprise transmitting (e.g., broadcasting) a service identifier such as an SSID. In another aspect, the first network can be a private network (e.g., home network). In a further aspect, the first network can be a public network. The access to the first network can be provided via a first network device.

In step 1004, an identifier can be received, for example, from the user device. In an aspect, the identifier can be associated with a particular user or user device. In an aspect, the identifier can comprise a MAC address, an IP address, or both. In an aspect, the identifier can be or comprise an addressable identifier (e.g., MAC address) associated with the user device. In another aspect, the identifier can be received as part of a DHCP request.

In step 1006, the identifier can be associated (e.g., mapped) to stored network information. In an aspect, the stored network information can comprise a service set identifier, security parameters, or both. In an aspect, the stored network information can be associated with the first network device. In another aspect, the stored network information can comprise an IP address. As an example, the stored network information can be or comprise an IP address local to the first network device.

In step 1008, the identifier can be received via a second network device. For example, the user device can connect to the second network device through an open connection and provide the identifier to the second network device upon connecting. In an aspect, the stored network information mapped to the received identifier can be retrieved by the second network device using the received identifier. In an aspect, the second network device 302a can forward the identifier of each attached user device to a remote server, such as computing device 310, to determine if the corresponding identifier has stored network information mapped to the identifier that can be retrieved. In an aspect, the user device 303 can request access to a remote server, such as computing device 310, prompting the remote server to forward stored network information mapped to the identifier to the second network device 302a. In an aspect, the stored network information can be an SSID and/or security parameters. In an aspect, the user device 303 can initially connect to the second network device 302a using an SSID known to belong to a particular provider. In a further aspect, the identifier of devices using the SSID belonging to the particular provider can be forwarded to a remote server, such as computing device 310, belonging to the provider, which can check to see if stored network information is mapped to the identifier. In another aspect, the second network can be a private network (e.g., home network). In a further aspect, the second network can be a public network. In an aspect, the first network device can be at a first location and the second network device can be at a second location different from the first location. In an aspect, secure access to the first network via the first network device can be discontinued.

In step 1010, secure access to a second network via the second network device can be provided. In an aspect, secure access can be provided using information comprising at least the identifier and the stored network information. In an aspect, the second network device can use the retrieved stored network information to create/broadcast an SSID originally associated with the first network device and already known to the user device. In a further aspect, the user device can then connect to the second network device using the newly created SSID and the resulting data transfer can be handled and/or secured using the security parameters associated with the first network device/SSID. In another aspect, the retrieved stored network information can be used to identify the first network. In another aspect, the security parameters used in the secure access provided in the communications via the first network device can be used in the secure access provided in communications via the second network device. In a further aspect, security parameters can include a password, WEP encryption, WPA encryption, WPA2 encryption, MAC address restriction, any other known security parameters, or any combination of security parameters.

Figure 11:
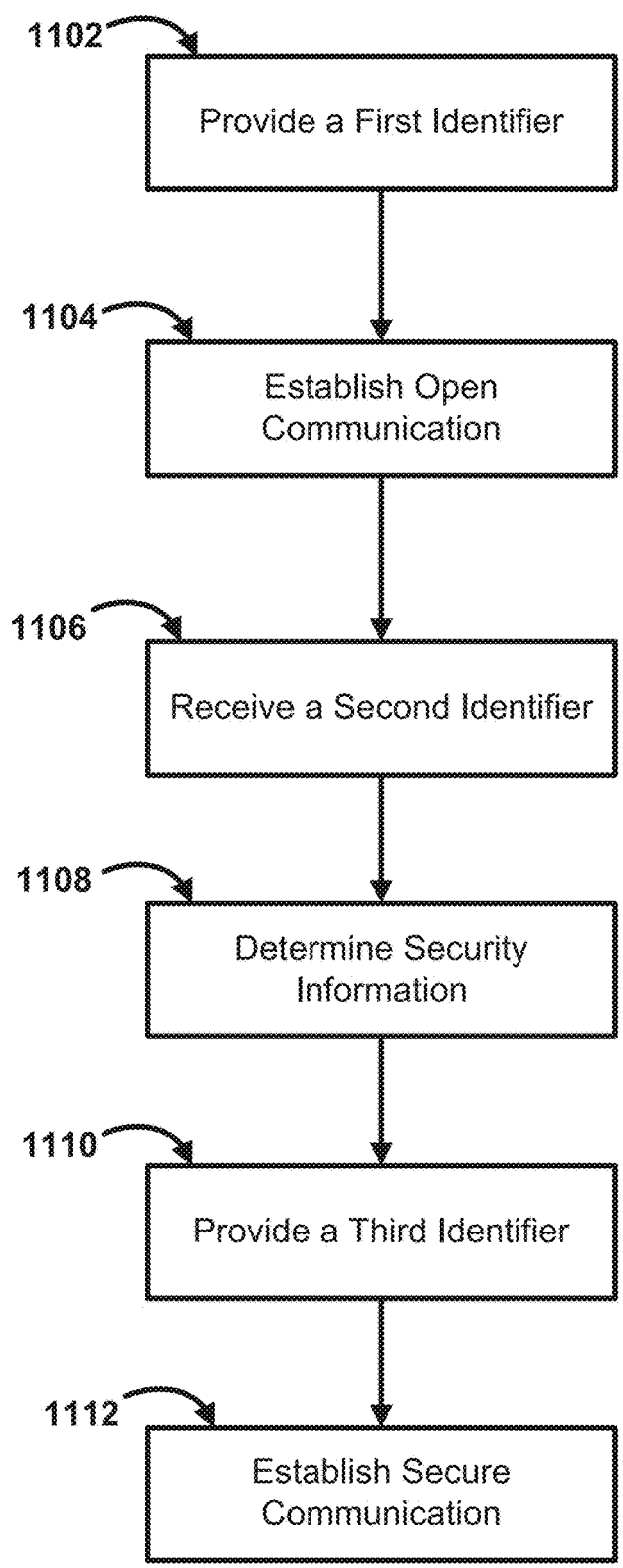
FIG. 11 is a flow chart of an exemplary method.

Another exemplary method is shown in FIG. 11. In step 1102, a first identifier can be provided, for example by a network device. In an aspect, the first identifier can be an SSID associated with a network. For example, network device 302a can provide SSID 309a to user device 303. In an aspect, the network can be a public network or a private network. As a further example, the network can be an open network.

In step 1104, open communication between a user device and the network can be established based on the first identifier, for example, through the network device. For example, the user device 303 can associate with network device 302a. In an aspect, the network device can broadcast the first identifier. In another aspect, the user device can receive the broadcasted first identifier. In an aspect, the first identifier can be or comprise a service set identifier (SSID). In another aspect, the user device can display the first identifier as a network with which the user device can connect. In another aspect, open communication between the user device and the network can be a result of a selection made on the user device.

In step 1106, a second identifier can be received, for example by the network device from the user device. For example, network device 302a can receive identifier 305 from user device 303. In an aspect, the second identifier can comprise a MAC address, an IP address, or both. In an aspect, the second identifier can be or comprise an addressable identifier (e.g., MAC address) associated with the user device. In an aspect, the second identifier can be received via the open communication.

In step 1108, security information associated with the user device can be determined/received. For example, network device 302a can transmit the second identifier to a remote server, such as computing device 310. The remote server can access information associated with the user device based on the second identifier. Prior to connecting to the network device, the information associated with the user device can already have been provided to the remote server. The remote server can then transmit the information associated with the user device 303 to the network device 302a. In an aspect, the transmitted information can comprise security information and a third identifier. The third identifier can be, for example, an SSID associated with another network device with which the user device already has configured security parameters (e.g., a home network device). In an aspect, the security information can be determined based at least in part by the second identifier. Security information can include a password, WEP encryption, WPA encryption, WPA2 encryption, MAC address restriction, any other known security information, or any combination of security information. The security information and the third identifier can represent a preconfigured SSID and security parameters used by the user device to connect to another network device (for example, a home network device). In a further aspect, the network device 302a can locally determine the security information of the transmitted information.

In step 1110, a third identifier can be provided, for example, by the network device to the user device. For example, the network device 302a can transmit the third identifier to the user device 303. In an aspect, the third identifier can be associated with the network. In another aspect, the third identifier can be associated with the security information. In an aspect, the third identifier can be or comprise a service set identifier (SSID). In another aspect, the third identifier can be the SSID of a known network, such as a home network. In a further aspect, the SSID of the known network can be broadcast to the user device to facilitate connection to the network device.

In step 1112, a secure communication between the user device and the network can be established. In an aspect, the established secure communication can be based on the third identifier. Establishment of the secure communication can be in response to a selection of the third identifier on the user device. In a further aspect, the secure communication can utilize the security information associated with the user device. The result being that the user device connects to the network device by using an SSID and security parameters that were previously configured for the user device to connect to another network device.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    providing, via a first network device, secure access to a first network;
    receiving, by a remote computing device via the first network device, an identifier associated with a user device;
    mapping the identifier to stored network information of the first network;
    receiving, from a second network device, the identifier;
    transmitting, by the remote computing device to the second network device, the stored network information of the first network mapped to the identifier;
    modifying, based on the identifier and the stored network information of the first network, operation of the second network device to provide secure access to a second network; and
    providing, via the second network device, secure access to the second network.

2. The method of claim 1, further comprising discontinuing secure access to the first network via the first network device.

3. The method of claim 1, wherein the first network comprises a private network and wherein the second network comprises a public network.

4. The method of claim 1, wherein the identifier comprises a MAC address, an IP address, or both.

5. The method of claim 1, wherein the stored network information of the first network comprises a service set identifier (SSID), security parameters, or both.

6. The method of claim 1, wherein the first network device is at a first location and the second network device is at a second location different from the first location.

7. A method comprising:
    receiving, by a remote computing device from a user device via a first network device, an identifier associated with the user device;
    associating the identifier with stored network information of a first network;
    receiving, via a second network device, the identifier;
    transmitting, to the second network device, the stored network information of the first network associated with the identifier;
    modifying, based on the identifier and the stored network information of the first network, operation of the second network device to provide secure access to a second network; and
    providing, to the user device via the second network device, secure access to the second network.

8. The method of claim 7, wherein the first network comprises a private network, and wherein the second network comprises a public network.

9. The method of claim 7, wherein the identifier comprises a MAC address, an IP address, or both.

10. The method of claim 7, wherein the stored network information of the first network comprises a service set identifier (SSID), security parameters, or both.

11. The method of claim 7, wherein the first network device is at a first location and the second network device is at a second location different from the first location.

12. The method of claim 7, wherein receiving, via the second network device, the identifier comprises establishing an open connection between the user device and the second network.

13. The method of claim 7, wherein one or more of the first network device or the second network device comprises a gateway.

14. An apparatus comprising:
    one or more processors; and
    a memory storing processor executable instructions that, when executed by the one or more processors, cause the apparatus to:
        receive, via a first network device, an identifier associated with a user device;
        map the identifier to stored network information of a first network;
        receive, via a second network device, the identifier;
        transmit, to the second network device, the stored network information of the first network mapped to the identifier;
        modify, based on the identifier and the stored network information of the first network, operation of the second network device to provide secure access to a second network; and
        provide, via the second network device using the identifier and the stored network information of the first network, secure access to the second network.

15. The apparatus of claim 14, wherein the first network comprises a private network and wherein the second network comprises a public network.

16. The apparatus of claim 14, wherein the identifier comprises a MAC address, an IP address, or both.

17. The apparatus of claim 14, wherein the stored network information of the first network comprises a service set identifier (SSID), security parameters, or both.

18. The apparatus of claim 14, wherein the first network device is at a first location and the second network device is at a second location different from the first location.

19. The apparatus of claim 14, wherein the processor executable instructions that, when executed by the one or more processors, cause the apparatus to receive, via the second network device, the identifier further cause the apparatus to establish an open connection between the user device and the second network.

20. The apparatus of claim 14, wherein one or more of the first network device or the second network device comprises a gateway.

* * * * *